Oct. 19, 1926.

G. R. SCHLEIER 1,603,557

SPEED REDUCING MECHANISM

Filed Feb. 4, 1926

Inventor
George R Schleier.
By Adam C. Fisher.
Attorney

Oct. 19, 1926.

G. R. SCHLEIER 1,603,557

SPEED REDUCING MECHANISM

Filed Feb. 4, 1926

Inventor
George R. Schleier.
By Adam E. Fisher.
Attorney

Patented Oct. 19, 1926.

1,603,557

UNITED STATES PATENT OFFICE.

GEORGE R. SCHLEIER, OF ST. LOUIS, MISSOURI.

SPEED-REDUCING MECHANISM.

Application filed February 4, 1926. Serial No. 85,845.

This invention relates to speed reducing transmission mechanisms for general industrial purposes, such as are ordinarily required in lumber, paper, rubber, sugar, cement, lime and gypsum mills, or for any use whatever where it may be required to transmit from a driving shaft rotating at a certain speed, a reduced speed to the driven shaft.

The objects of the invention are to provide a mechanism of the kind referred to in as simple a form as consistent with practical utility; to provide such mechanism of the worm and worm wheel type wherein end thrust in the worm is eliminated; to provide such mechanism of the worm and worm wheel type wherein the worm wheel is equipped with roller teeth for the purpose of reducing friction; to provide such mechanism having two power transmission shafts either of which may be used independently of the other or both of which may be used simultaneously; and finally to provide such mechanism in a form which may be readily assembled or disassembled as required.

In the drawing—

Figure 1:
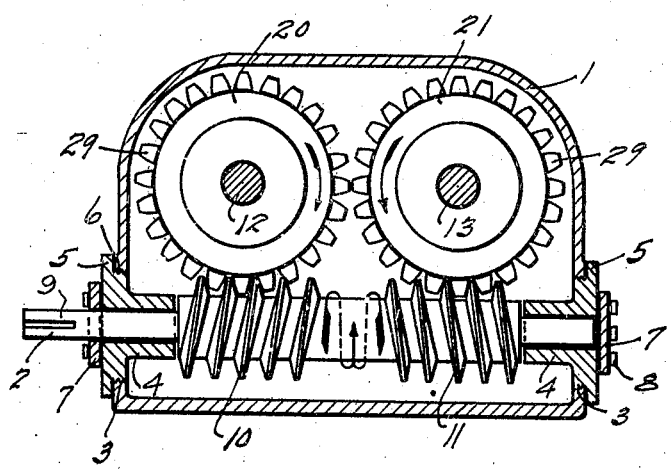
Figure 1 is a side elevation of the mechanism, the housing being shown in section.
Figure 2:
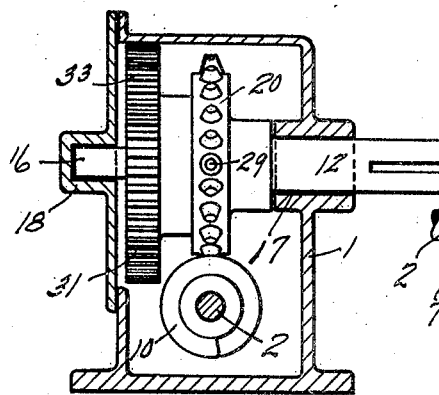
Figure 2 is an end view, the housing being shown in section.
Figure 3:
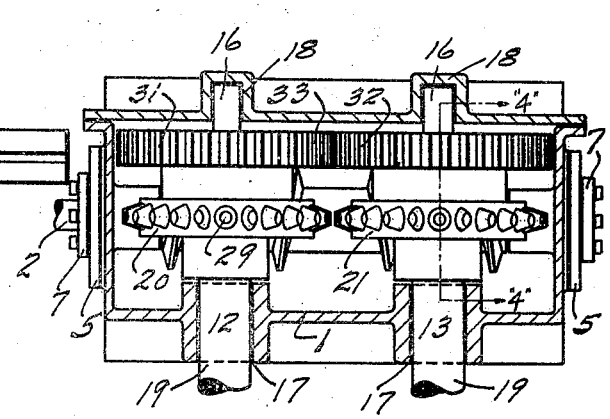
Figure 3 is a plan view, the housing being shown in section.
Figures 6, 7:
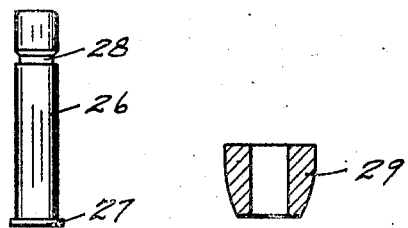
Figure 6 is an enlarged detail of one of the roller tooth pins.
Figure 7 is an enlarged detail of one of the roller teeth.
Figure 4:
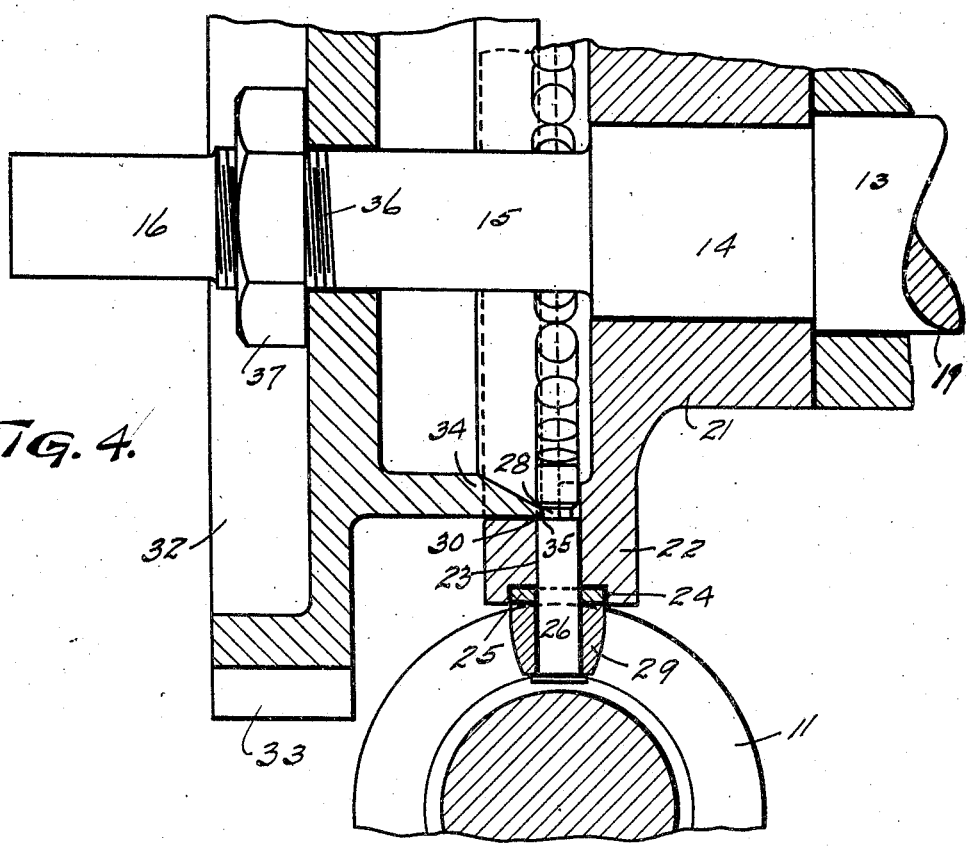
Figure 4 is an enlarged cross section on the line 4—4 in Figure 3.
Figure 5:
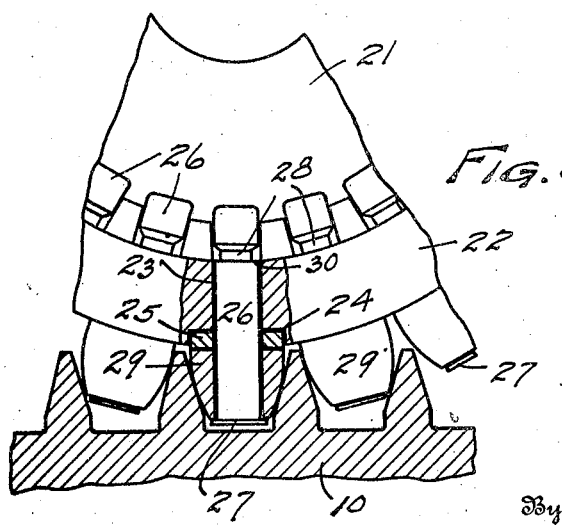
Figure 5 is an enlarged detail view of several of the roller teeth of the worm wheel and intermeshing threads of the worm.
Figure 8:
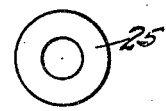
Figure 8 is an enlarged detail of one of the washers seated upon the roller tooth pins back of the roller teeth.

In carrying out this invention a suitable casing or housing 1 is provided, through the lower portion of which is journaled a worm shaft 2. This is best accomplished by boring aligned bearing holes 3 through the opposite casing walls and inserting in these openings journal boxes 4 formed with offset stop flanges 5 which abut against the outer sides of the housing 1. The boxes 4 are detachably mounted in place in any conventional manner, as by threaded engagement with the apertures 3, as shown at 6. The ends of the shaft 2 are then journaled in the boxes 4 and grease caps 7 are screwed to the boxes as shown at 8. An end of the shaft 2 is extended into the open, to which is hitched the driving element (not shown), the speed of which it is desired to reduce. Left and right worms, hereinafter referred to as reversed worms and numbered 10 and 11 are mounted upon the shaft 2, preferably by forming the shaft and worms integrally; and these worms may be of single or multiple threads, although in practical use it is found that the multiple threaded worms are preferable. The apertures 3 are large enough to permit the insertion or removal of the shaft and worms. Twin gear shafts 12 and 13 are journaled through the housing 1 above the shaft 2 and transversely thereto, these shafts being located one over each of the said worms 10 and 11. The shafts 12 and 13 are stepped as shown at 14, 15 and 16, the shafts at their full diameters being journaled through one side of the casing as shown at 17 and the final reduced ends 16 being journaled in bearing sockets 18 formed integrally with the opposite side of the casing. Thus these shafts 12 and 13 may be readily inserted or withdrawn. To the extended shaft ends 19, may be hitched the driven element (not shown) which it is desired to run at a reduced speed as compared with the driver. Dished worm wheels 20 and 21 are keyed upon the steps 14 of the shafts 12 and 13, the planes of the wheels being coincident and the dished rims 22 thereof being set out immediately over the worms 10 and 11. Tooth pin holes 23 are bored radially around the rims 22, the same being spaced apart regularly to conform to the pitch of the threads of the said worms 10 and 11, and the outer ends of the holes being countersunk as shown at 24 to engage washers 25. Tooth pins 26 are provided, adapted snugly to pass into the holes 23, the outer ends of these pins having integral retaining caps 27 and the inner ends having the lock grooves 28 cut therein. Tapered and hollow roller teeth 29 are then journaled upon the outer extended ends of the pins 26 and are held in place by the caps 27 and the pins, each thus equipped with a roller tooth, are inserted into the holes 23 around the rims 22 of the worm wheels. When thus disposed the lock grooves 28 of the pins 26 should just clear the inner peripheries of the rims 22, as shown at 30. The worm wheels 20 and 21 are spaced apart sufficiently so that their respective teeth 29 will fully clear one another and not intermesh in any degree, as clearly shown in Figure 3. Upon the steps 15 of the shafts 12 and 13 are keyed the equalizing spur gear wheels 31 and 32, the planes of which are also coincident, and the teeth 33 of which are intermeshed as shown in Figure 3. Annular, tapered, lock flanges 34 extended from the inner faces of these gears are adapted to slidingly pass within the inner peripheries of the rims 22, with the tapered edges 35 of these flanges engaging the lock grooves 28 of the pins 26. Thus the pins 26 are releasably held in position upon the rims 22. Threads 36 are cut upon the outer ends of the steps 15, and nuts 37 turned upon these threads serve to lock the gear assemblies described upon the shafts 12 and 13.

The use and operation of this reducing mechanism will be apparent from the foregoing description. It will be noted that the gears and worm wheels will rotate in opposite directions, and that a load upon either of the shafts 12 or 13 will be equalized between the two shafts by virtue of the intermeshing gears 31 and 32.

It will be also noted that there will be practically no end thrust upon the worm shaft 2 and that thrust bearings are thus dispensed with. The roller teeth of the worm wheel practically eliminate friction upon the worm threads. This assembly is very readily assembled or disassembled, and is thought to be a very efficient and practical design for the purpose intended.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. A mechanism of the kind described, comprising a journaled worm shaft, the said shaft carrying reversed worms; gear shafts journaled above and transversely to the said worm shaft; worm wheels rigidly mounted upon the gear shafts, the said worm wheels having offset rims, the said rims having radial tooth pin holes formed therearound; tooth pins in the said pin holes of the wheel rim, the said pins having retaining caps at their outer ends and lock grooves cut around their inner ends; hollow roller teeth journaled upon the outer extended ends of the said tooth pins, the said roller teeth of the respective worm wheels being in mesh with the respective reversed worms aforesaid; and intermeshing equalizing gear wheels rigidly mounted upon the said gear shafts at the side of the said worm wheels, the said gear wheels having annular tapered lock flanges extended from their sides adjacent the offset rims of the said worm wheels, and into engagement with the said lock grooves of the tooth pins.

2. A mechanism of the kind described, comprising a worm shaft; reversed worms upon the worm shaft; a gear shaft journaled transversely to each of the said worms; a worm wheel and gear wheel rigidly mounted side by side upon each of the said gear shafts, the said wheels being aligned and the gear wheels being in mesh, the said worm wheels having offset rims adjacent the gear wheels, the said offset rims of the worm wheels having radial tooth pin holes, and the said gear wheels having annular, tapered side flanges extended adjacent the worm wheels; tooth pins in the said tooth pin holes of the rims of the worm wheels, the said pins having retaining caps at their outer ends and lock grooves cut around their inner ends, the said lock grooves engaging the said tapered flanges extending from the said gear wheels; and hollow roller teeth journaled upon the outer extended ends of the said tooth pins and held in place thereupon by the said retaining caps thereof, the said roller teeth of each worm wheel being placed in mesh with its respective worm of the worm shaft; and means for supporting the said shafts in operative relation.

3. In a mechanism of the kind described, a shaft; a gear wheel and a worm wheel mounted in contiguity upon the shaft, the said worm wheel having an offset rim adjacent the gear wheel, the said offset rim having radial tooth pin holes, and the said gear wheel having an annular, tapered side flange extended adjacent the worm wheel; tooth pins in the said tooth pin holes of the rim of the worm wheel, the said pins having lock grooves cut around their inner ends, the said lock grooves engaging the said tapered side flange extending from the gear wheel.

4. In a mechanism of the kind described, a shaft; a gear wheel and a worm wheel mounted in contiguity upon the shaft, the said worm wheel having an offset rim adjacent the gear wheel, the said offset rim having radial tooth pin holes, and the said gear wheel having an annular, tapered side flange extended adjacent the worm wheel; tooth pins in the said tooth pin holes of the rim of the worm wheel, the said pins having lock grooves cut around their inner ends, the said lock grooves engaging the said tapered side flange extending from the gear wheel; and hollow roller teeth journaled upon the extended ends of the said tooth pins.

5. A mechanism of the kind described, comprising a worm shaft provided with reversed worms; twin gear shafts across the said worms; a gear wheel and a worm wheel locked in contiguity upon each gear shaft with the gear wheels in mesh with each other and the worm wheels in mesh with their respective worms; the rims of the worm wheels being offset towards the gear wheels and pierced with radial tooth pin holes; the gear wheels having annular side flanges with tapered edges extended towards the worm wheels; tooth pins in the said tooth pin holes of the rims of the worm wheels, the said pins having lock grooves around their inner ends clearing the inner peripheries of the said rims of the worm wheels and engaging the said tapered edges of the annular side flanges of the gear wheels, whereby the said tooth pins are releasably locked in place.

In testimony whereof I affix my signature.

GEORGE R. SCHLEIER.